(12) United States Patent
Vanderspek (10) Patent No.: US 8,655,937 B1
(45) Date of Patent: Feb. 18, 2014

(54) HIGH PRECISION INTEGER DIVISION USING LOW PRECISION HARDWARE OPERATIONS AND ROUNDING TECHNIQUES

(75) Inventor: Julius Vanderspek, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1276 days.

(21) Appl. No.: 12/432,064

(22) Filed: Apr. 29, 2009

(51) Int. Cl.
*G06F 7/52* (2006.01)

(52) U.S. Cl.
USPC ........................................................ 708/650

(58) Field of Classification Search
None
See application file for complete search history.

(56) References Cited

U.S. PATENT DOCUMENTS

| 4,878,190 | A | | 10/1989 | Darley et al. | |
|---|---|---|---|---|---|
| 5,249,149 | A | * | 9/1993 | Cocanougher et al. | 708/504 |
| 5,737,255 | A | | 4/1998 | Schwarz | |
| 6,598,065 | B1 | | 7/2003 | Harrison | |
| 8,140,608 | B1 | * | 3/2012 | Juffa | 708/650 |
| 2002/0016808 | A1 | * | 2/2002 | Pelton et al. | 708/653 |
| 2004/0117423 | A1 | | 6/2004 | Shi et al. | |
| 2005/0289209 | A1 | | 12/2005 | Robison | |
| 2006/0064454 | A1 | * | 3/2006 | Wang et al. | 708/651 |

FOREIGN PATENT DOCUMENTS

| WO | WO 2008/127610 | 10/2008 |
|---|---|---|
| WO | WO 2008/127622 | 10/2008 |
| WO | WO 2008/127623 | 10/2008 |

OTHER PUBLICATIONS

Oberman, et al. "Design Issues in Division and Other Floating-Point Operations," IEEE Transaction on Computers, vol. 46, No. 2, Feb. 1997, pp. 154-161.

Oberman, Stuart F. "Floating Point Division and Square Root Algorithms and Implementation in the AMD-K7 Microprocessor," Proceedings of the 14th IEEE Symposium on Computer Arithmetic, Apr. 1999, pp. 106-115.

AMD, "Software Optimization Guide for AMD64 Processors," Sep. 2005, available at www.amd.com/us-en/assets/content_type/white_papers_and_tech_docs/25112.PDF.

Alverson, Robert, "Integer Division Using Reciprocals," In Proceedings of the 10th Symposium on Computer Arithmetic, 1991, pp. 186-190.

Robison, Arch D. "N-Bit Unsigned Division Via N-Bit Multiply-Add," 17th IEEE Symposium on Computer Arithmetic, 2005, pp. 131-139.

Non-Final Office Action, U.S. Appl. No. 12/030,178, dated Mar. 16, 2011.

Moss, et al. "Toward Acceleration of RSA Using 3D Graphics Hardware," LNCS 4887, Dec. 2007, pp. 369-388.

Eggers, et al. "Simultaneous Multithreading: A Platform for Next-Generation Processors," IEEE Micro, vol. 17, No. 5, pp. 12-19, Sep./Oct. 1997.

\* cited by examiner

*Primary Examiner* — Henry Tsai
*Assistant Examiner* — Aurangzeb Hassan
(74) *Attorney, Agent, or Firm* — Patterson + Sheridan, L.L.P.

(57) ABSTRACT

One or more embodiments of the invention set forth techniques to perform integer division using a floating point hardware unit supporting floating point variables of a certain bit size. The numerator and denominator are integers having a bit size that is greater than the bit size of the floating point variables supported by the floating point hardware unit. Error correcting techniques are utilized to account for any loss of precision caused by the floating point operations.

20 Claims, 7 Drawing Sheets

HIGH PRECISION INTEGER DIVISION USING LOW PRECISION HARDWARE OPERATIONS AND ROUNDING TECHNIQUES

BACKGROUND OF THE INVENTION

1. Field of the Invention

The present invention relates generally to computer arithmetic and more specifically to performing integer division using floating-point units.

2. Description of the Related Art

Many current computer processors do not incorporate integer division logic into the digital circuit design of their arithmetic logic units (ALUs) because integer division operations tend to be infrequent operations that do not justify the hardware expense to incorporate such logic. As such, integer division is typically implemented in software, utilizing algorithms that leverage arithmetic operations that are available in the ALU, such as addition, subtraction, multiplication, logical operations (AND, NOT, OR, XOR), and bit-shifting. For example, a classic "shift and subtract" algorithm for integer division utilizes only addition, subtraction, compare (i.e., AND operation) and shifting operations and mimics well-known long division techniques.

Figure 1A:
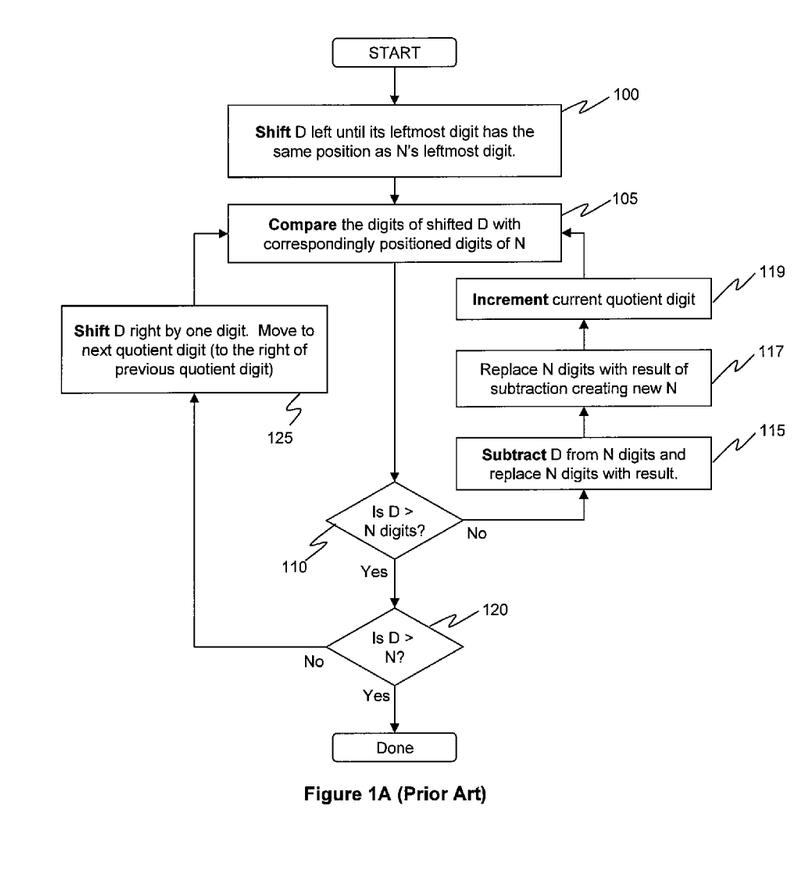
FIG. 1A is flow diagram of steps of a classic "shift and subtract" algorithm for integer division, according to the prior art.

FIG. 1A depicts a flowchart of a classic "shift and subtract" algorithm for integer division. Utilizing the terms "N" (i.e., numerator or dividend) and "D" (i.e., denominator or divisor) to represent a division operation, N÷D, in step 100, as in traditional long division, D is left-aligned with N (e.g., visually, D can be left-aligned and written under N). In step 105, the digits of D are compared against the corresponding digits of N (e.g., above D) to determine the leftmost digit (i.e., most significant) of the quotient. If D is greater than the corresponding N digits in step 110, the corresponding N digits are subtracted from D (step 115), the result of the subtraction replaces the corresponding N digits in N, creating a new N (step 117) representing the remaining dividend, and the current quotient digit is incremented (step 119). Once D is less than the corresponding N digits above it and D is less than the current version of N (step 120), D is shifted to the right one digit (step 125) and the next quotient digit is determined by repeating the process of steps 105 through 119 until D is larger than the current N (i.e., remaining dividend) in step 120.

Figure 1B:
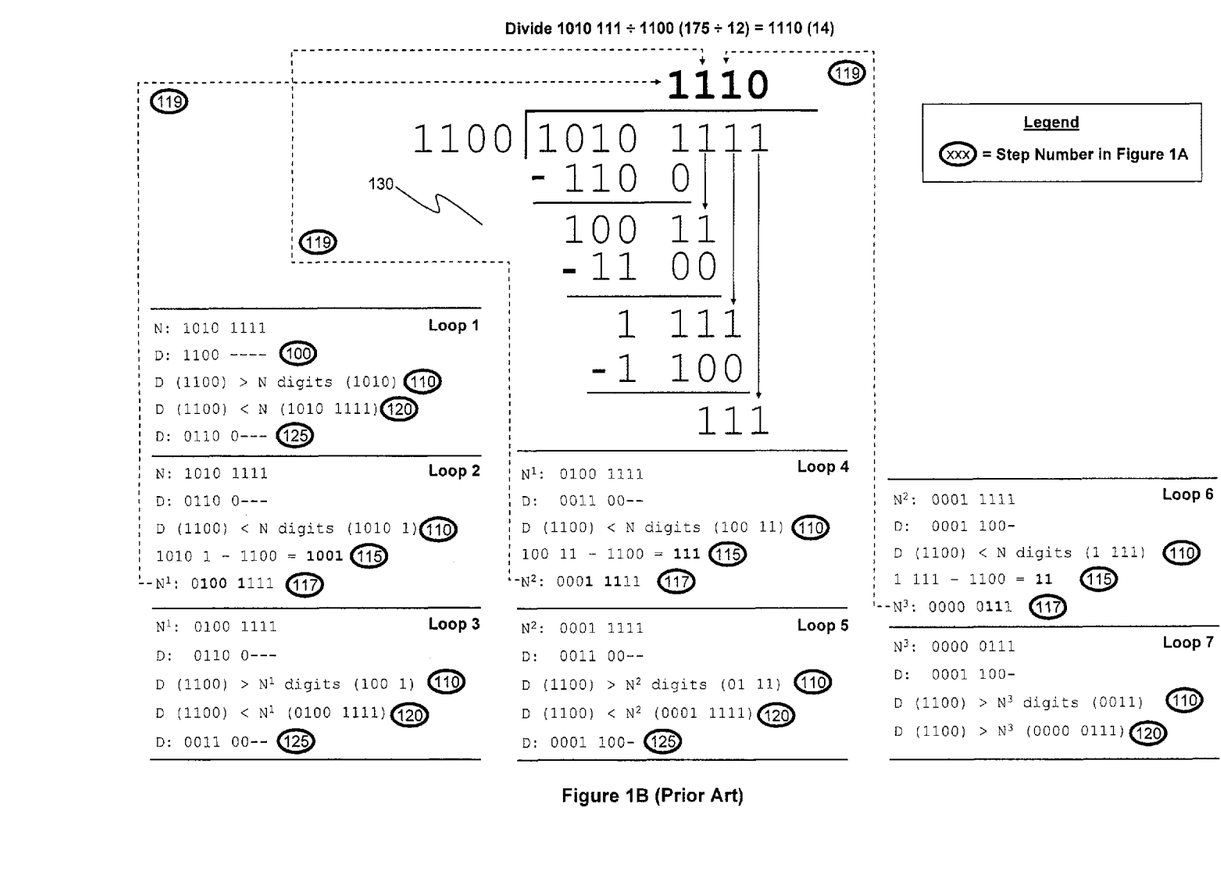
FIG. 1B illustrates an integer division operation utilizing the shift and subtract algorithm of FIG. 1A.

FIG. 1B depicts a visual representation of flowchart of FIG. 1A when executing the division operation 175÷12 in binary form. As can be seen, the various loops in FIG. 1B depict that various iterations through the loops created by steps 105-110-115-117-119 and steps 105-110-120-125 and mimic the traditional long division steps displayed in 130. Due to these iterations, a software implementation of integer division utilizing the shift and subtract algorithm or other similar division techniques can consume a significant amount of computing time and cycles. It should be noted that there exist other known integer division algorithms that improve on this classic "shift and subtract" technique, for example, by utilizing "oracles" to eliminate repetitive iterations such as those created by steps 105-110-115-117-119; however, even with such improved techniques, a pure software implementation of such techniques also consume significant amounts of computing time and cycles.

In contrast, floating point division is an operation that is typically provided in the digital circuit design of floating point units (FPUs) of processors. As such, floating point division is often significantly faster than integer division because floating point division is implemented in the hardware while integer division is implemented at the software level. For example, certain commercial processors report that integer division in software for a 32 bit integer consumes 39 cycles while floating point division in hardware for a double precision float (64 bits) consumes only 20 cycles.

Figure 1C:
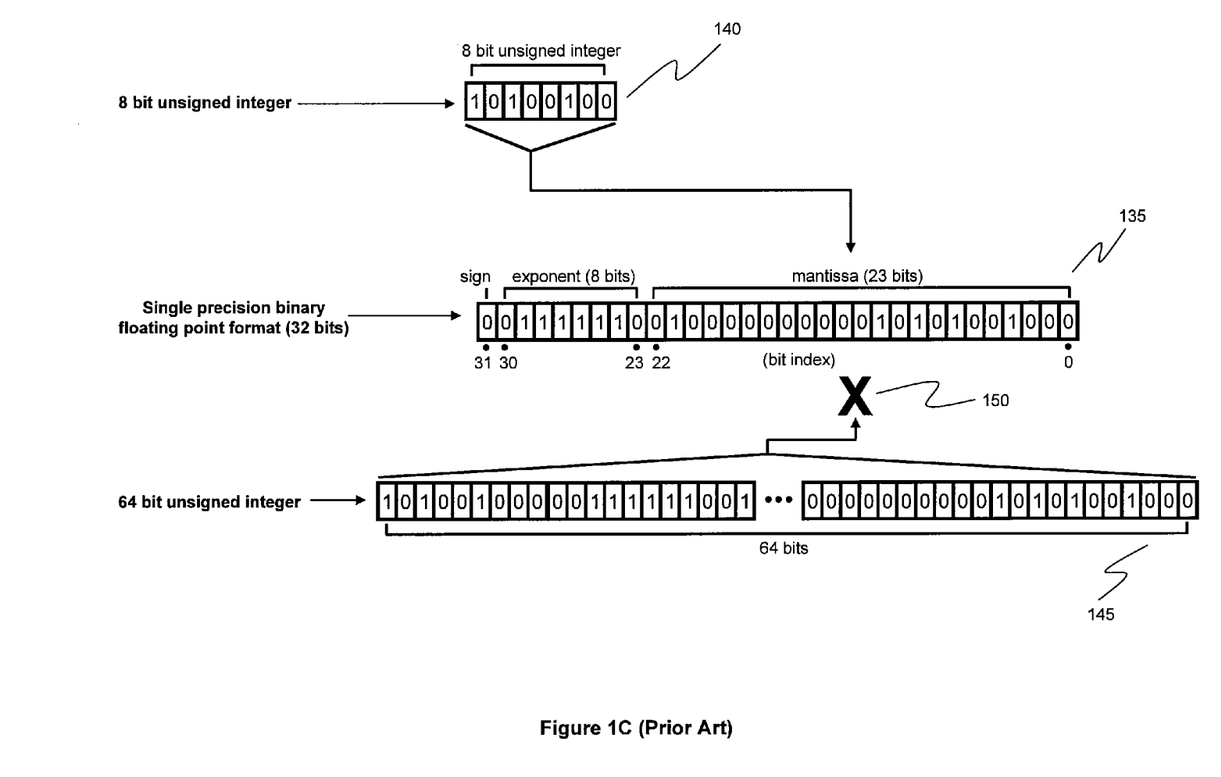
FIG. 1C illustrates bitwise formats for integers and floating points used in conventional computing systems.

Depending upon the format used for floating point numbers in a computing system, integer division can be performed by converting the integers into the floating point format and then executing a floating point division in the FPU. FIG. 1C depicts various integer and floating point formats used in a typical computing system. Format 135 represents a single precision floating point in accordance with the IEEE 754 standard (hereinafter, also referred to as a "float"). As can be seen, the format of a float is subdivided into 3 sections: 1 bit is a sign bit, 8 bits represent the exponent, and 23 bits represents the mantissa or fractional value. The mantissa contains the digits of value in the float, in this case, 23 bits of precision (24 bits of precision, implicitly, in accordance with the IEEE 754 standard). As such, integer division can be performed on integers that utilize less then 24 bits, such as an 8 bit unsigned integer 140, by converting or casting the integers into floats (i.e., inserting the 8 bits into the mantissa) and executing the division as a floating point division through an FPU. The float result can be converted or cast back into an integer without loss of precision. However, a 64 bit unsigned integer 145 would not fit into the 24 bits of mantissa of float (see 150). Specifically, 40 bits of precision would be lost if a 64 bit unsigned integer 145 was converted into a 32 bit float.

As the foregoing illustrates, what is needed in the art is a technique for performing higher precision (e.g., 64 bit) integer division operations with a low precision (e.g., 32 bit) hardware operation, such as a division operation in a floating point unit that only supports floating point formats (e.g., 32 bit float with 24 bits of precision, etc.) whose mantissas are significantly smaller than the bit size of the integers (e.g., 64 bits).

SUMMARY OF THE INVENTION

One or more embodiments of the present invention provide methods for performing higher precision integer division (e.g., 64 bit) with a low precision (e.g., 32 bit) hardware operation such as a division operation in a floating point unit. Such methods may be incorporated into a compiler to enable a programmer to write code including integer division that can then be compiled into an executable that can, for example, run in on a computing system that includes an FPU but does not include an ALU that performs integer division.

According to one embodiment of the present invention, a computer-implemented method for performing integer division between a numerator and a denominator on a processing unit that supports operations using variables of a first bit size, wherein the numerator and the denominator are integers having a second bit size that is greater than the first bit size, is disclosed herein: The method begins by subdividing the numerator into a plurality of equal sized partitions, wherein each partition has a third bit size, converting the denominator into a variable of the first bit size, dividing the numerator by the variable of the first bit size to obtain a current approximation of a current portion of a quotient, wherein the current approximation of the current portion of the quotient has the third bit size, subtracting a product of the current approximation of the current portion of the quotient and the denominator from the numerator to generate a subsequent numerator, wherein a fourth bit size of most significant bits associated with the subsequent numerator represents a bit overflow error value utilized to correct the first approximation of the first portion of the quotient, and storing the current approximation of the current portion of the quotient in a memory.

The method, according to one embodiment of the present invention, further continues by dividing the subsequent numerator by the variable of the first bit size to obtain a subsequent approximation of a subsequent portion of the quotient that has a bit size equal to the third bit size plus the fourth bit size, adding a number of most significant bits equal to the fourth bit size associated with the subsequent approximation to a number of least significant bits equal to the fourth bit size associated with the current approximation to generate a corrected current approximation of the current portion of the quotient, multiplying the subsequent approximation of the subsequent portion of the quotient with the denominator to obtain a product, and subtracting the product from the subsequent numerator to generate a next numerator, wherein the fourth bit size of most significant bits associated with the next numerator represents a bit overflow error value utilized to correct the subsequent approximation of the subsequent portion of the quotient.

The foregoing steps of dividing, adding, multiplying and subtracting are repeated, wherein, for each current iteration of the dividing, adding, multiplying and subtracting steps, the next numerator generated in the subtracting step of the immediately preceding iteration is used as the subsequent numerator in the dividing step of the current iteration, the subsequent approximation obtained in the dividing step of the current iteration is used as the subsequent approximation in the adding step of the current iteration, and the subsequent approximation obtained in the dividing step of the immediately preceding iteration is used as the current approximation of the adding step of the current iteration, until a total number of corrected approximations of portions of the quotient have been generated equal to the number of equal sized partitions included in the plurality of equal sized partitions.

One advantage of the disclosed method is that integer division can be performed more efficiently by using floating-point hardware relative to techniques that are performed solely in software (e.g., only utilizing integer-based operations offered in an ALU).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2:
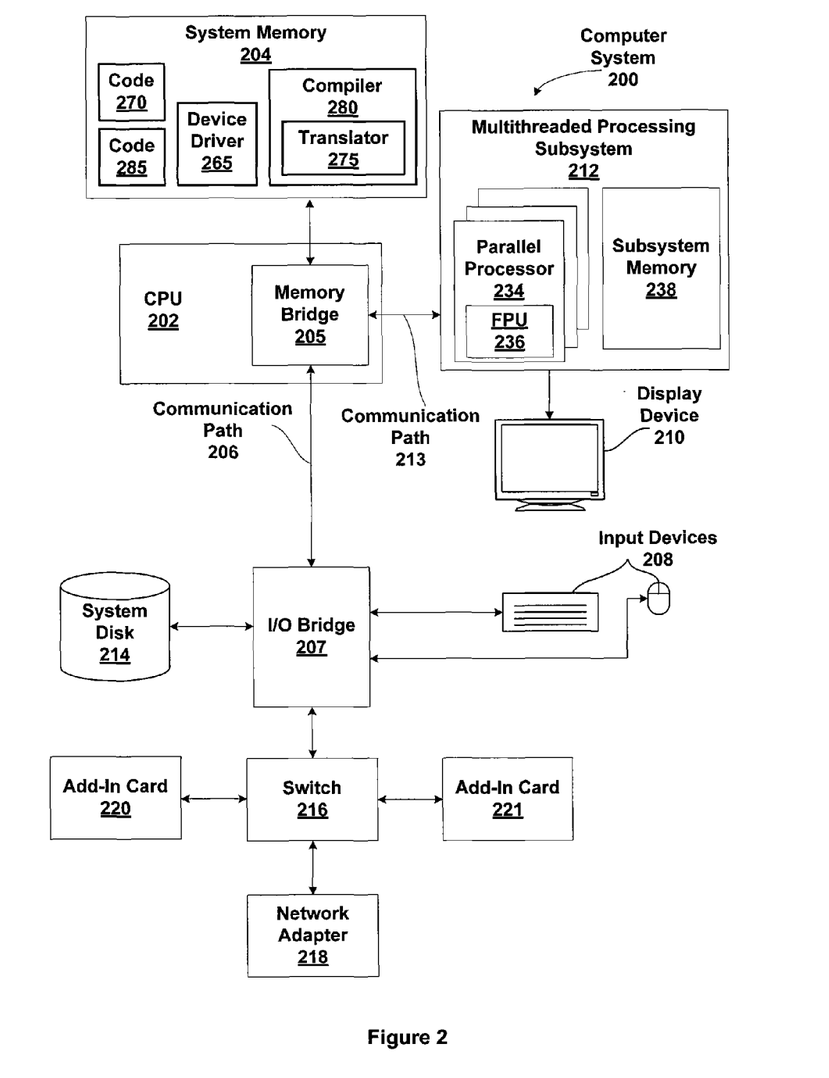
FIG. 2 is a block diagram of a computer system that includes a compiler configured to transform source code integer division operations into a series of instructions that utilize floating point operations to perform the integer division, according to one embodiment of the invention.

FIG. 2 is a block diagram of a computer system that includes a compiler configured to transform source code integer division operations into a series of instructions that utilize floating point operations to perform the integer division, according to one embodiment of the invention. Computer system 200 includes a CPU 202 and a system memory 204 communicating via a bus path that includes a memory bridge 205. In the embodiment of FIG. 2, CPU 202 does not contain an arithmetic logic unit (ALU) that supports integer division. Memory bridge 205, which may be, e.g., a northbridge chip, is connected via a bus or other communication path 206 (e.g., a HyperTransport link) to an I/O (input/output) bridge 207. I/O bridge 207, which may be, e.g., a southbridge chip, receives user input from one or more user input devices 208 (e.g., keyboard, mouse) and forwards the input to CPU 202 via path 206 and memory bridge 205. A system disk 214 is also connected to I/O bridge 207. A switch 216 provides connections between I/O bridge 207 and other components such as a network adapter 218 and various add-in cards 220 and 221. Other components (not explicitly shown), including USB or other port connections, CD drives, DVD drives, film recording devices, and the like, may also be connected to I/O bridge 207. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

A multithreaded processing subsystem 212 is coupled to memory bridge 205 via a bus or other communication path 213 (e.g., a PCI Express, Accelerated Graphics Port, or HyperTransport link). In the embodiment of FIG. 2, multithreaded processing subsystem 212 is a graphics subsystem that delivers pixels to a display device 210 (e.g., a conventional CRT or LCD based monitor). Multithreaded processing subsystem 212 includes subsystem memory 238 and incorporates one or more parallel processors 234, each having its own floating point processor (FPU) 236. One such example of a multithreaded processing system 212 is NVIDIA's GeForce® 8 GPU, which has 128 processing cores (i.e., processors), with each core having its own FPU and a set of 1024 registers. Each cluster of 8 processing cores also has 16 KB of shared memory supporting parallel data access. Such an architecture is able to support up to 12,288 concurrent threads, with each thread having its own stack, registers (i.e., a subset of the 1024 registers in a processing core), program counter and local memory.

CPU 202 operates as the control processor of computer system 200, managing and coordinating the operation of other system components. In particular, CPU 202 can issue floating point operations for execution on the FPUs of parallel processors 234 within multithreaded processing subsystem 212. For example, when executing an application that includes a portion of highly parallelized and computationally expensive graphics processing code (e.g., including floating point operations, etc.), CPU 202 instructs multithreaded processing subsystem 212 to perform the instructions of the code portion in order to leverage parallel processors 234 and their corresponding FPUs 236.

System memory 204 includes an execution image of an operating system, a device driver 265, and original source code 270 that contains programming instructions that include integer division operations. In the context of the present description, code refers to any source code, human readable programming language code, or other computer code, instructions, and/or functions that may be executed or compiled for execution on a processor. For example, in various embodiments, the code may be C code, C++ code, etc. In one embodiment, the original code 270 may include a language extension or library for a computer language (e.g., an extension or library for C, C++, etc.), for example, to support specialized functions, such as parallel processing in multithreaded processing system 212. Because original code 270 includes integer division operations and CPU 202 does not include an ALU that supports integer division directly on hardware, original code is transformed using translator component 270 of a compiler 280 to produce transformed code 285 that contains a set of instructions that perform integer division utilizing floating point operations. In one embodiment, transformed code 285 is represented in the same programming language used in original code 270 (e.g., C or C++, etc.). It should be recognized that alternative embodiments may utilize a translator that functions separately from the compiler 280 but whose function is similar to translator component 275. In other embodiments, compiler 180 may be included within device driver 265 that is configured to interface between original code 270, transformed code 285 and CPU 205 and to provide instructions for managing and coordinating the operation of multithreaded processing subsystem 212. Those with ordinary skill in the art will recognize that FIG. 2 is merely one exemplary embodiment of a computing system in which the inventions disclosed herein may be utilized and that any computing system architecture that does not support integer division in its ALUs and includes an accessible FPU can utilize the teachings herein.

Figure 3A:
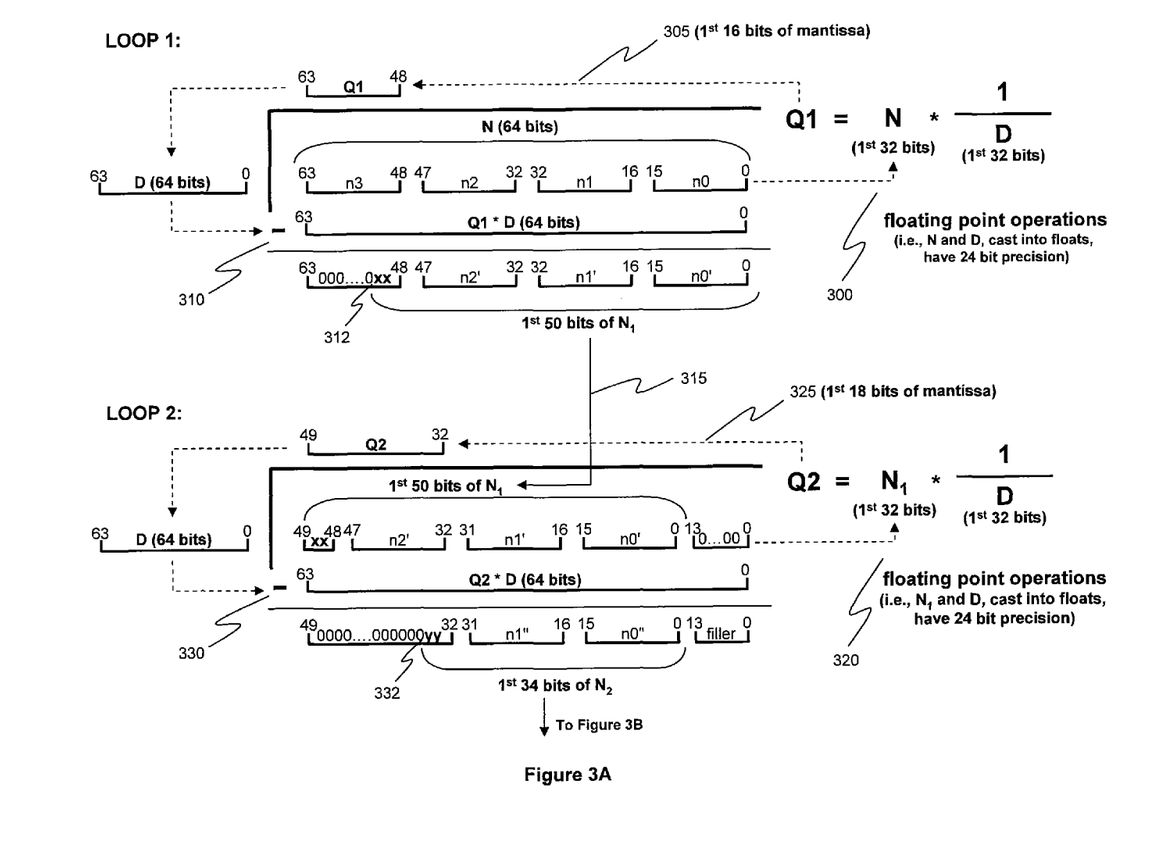
FIGS. 3A-3B depict a conceptual illustration for performing integer division between 64 bit unsigned integers utilizing 32 bit floats, according to one embodiment of the invention.
Figure 3B:
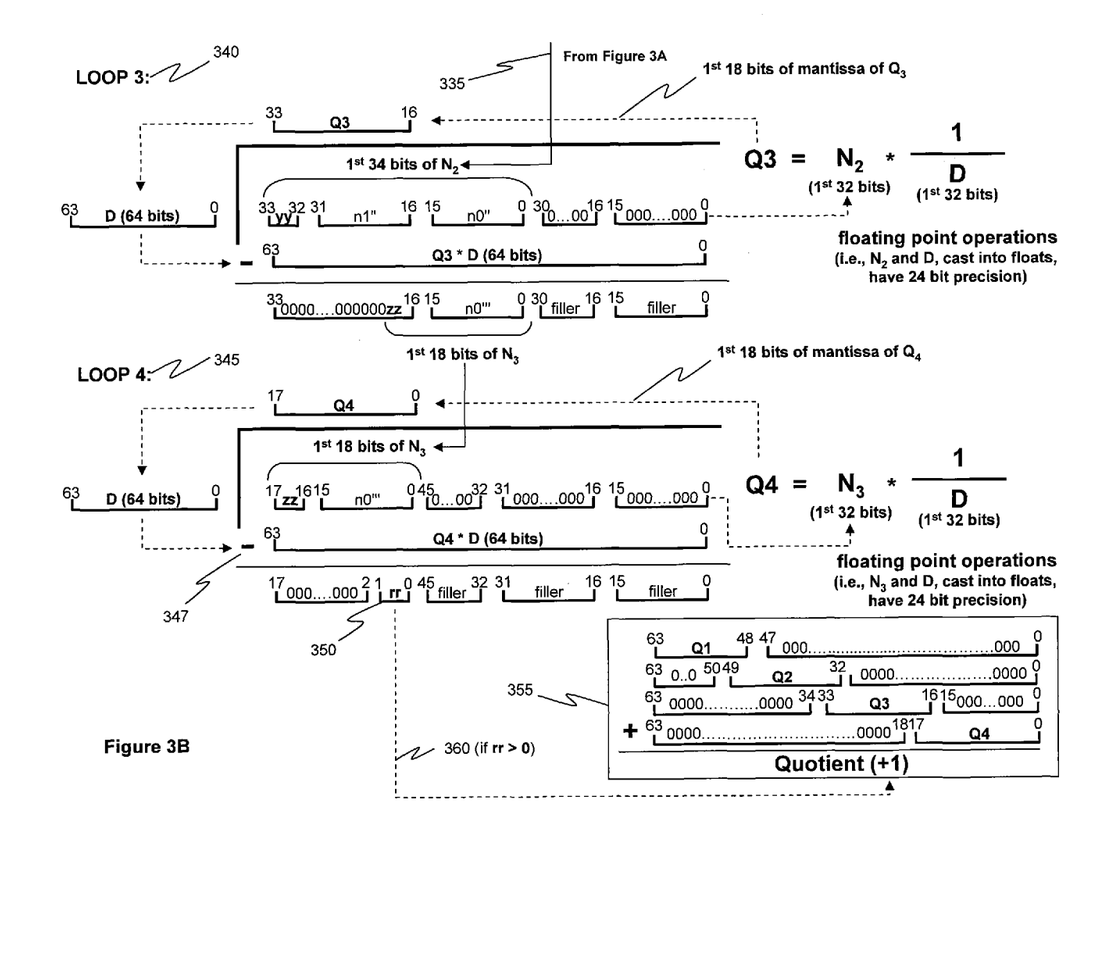

FIGS. 3A-3B depict a conceptual illustration for performing integer division between 64 bit unsigned integers utilizing 32 bit floats, according to one embodiment of the invention. The first 64 bit integer is N and represents the numerator and the second 64 bit integer is D and represents the denominator. N is subdivided into 4 16 bit portions, n0, n1, n2 and n3 and the first 32 bits of D and N are cast into 32 bit floats (thereby losing precision from 32 bits to 24 bits, as discussed in the context of FIG. 1C). As shown in 300, floating point operations on an FPU (i.e., taking the reciprocal of D and multiplying by N) are performed on the float representations of the first 32 bits of N and D yielding a float value, Q1, that estimates the quotient of the first 32 bits of N divided by the first 32 bits of D to a precision of 24 bits. Because the mantissa of Q1 contains the bits of value, the first 16 bits of the mantissa of Q1 can be taken as the first 16 bits of the 64 bit quotient of N and D, as shown in 305. The first 16 bits of Q1 are multiplied by D (all 64 bits) and the product is subtracted from N (all 64 bits) as shown in 310, yielding an intermediary value of N.

However, due to loss of precision caused by the use of lower precision (e.g., 32 bit) floating point operations to obtain Q1 in 300, Q1 may be an underestimation of the correct first 16 bits of the 64 bit quotient of N and D such that the subtraction in 310 results in a 2 bit error overflow, shown as xx 312 in FIG. 3A (i.e., Q1 is an underestimation such that the subtraction 310 does not properly clear the first 16 bits of N). To incorporate this 2 bit error overflow into the next iteration, as depicted in 315, this intermediary value of N is shifted 14 bits to the left, referred to in FIG. 3A as $N_1$, and utilized in the next iteration.

In the next iteration, the first 32 bits of $N_1$ are cast into a 32 bit float and, in 320, floating point operations on an FPU (i.e., taking the reciprocal of D and multiplying by $N_1$) are performed on the float representations of the first 32 bits of $N_1$ and D yielding a float value, Q2, that estimates the quotient of the first 32 bits of $N_1$ divided by the first 32 bits of D to a precision of 24 bits. Because the mantissa of Q2 contains the bits of value, the first 18 bits of the mantissa of Q2 are taken as a concatenation of (1) an error adjustment for the last 2 bits of the first 16 bits of the 64 bit quotient of N and D, and (2) the subsequent next 16 bit portion (i.e., second 16 bits) of the 64 bit quotient of N and D, as shown in 325. Specifically, the first two bits of Q2 represent adjustment to bits 49 and 48 of the 64 bit quotient of N and D, if, bits 48 and 49 were underestimated in Q1 during the first iteration. Q2 (the first 18 bits) is then multiplied by D (all 64 bits) and the product is subtracted from $N_1$ (all 64 bits) as shown in 330, yielding another intermediary value of N. Similar to the first iteration, Q2 may be an underestimation due to loss of precision in the lower precision floating point operation of 320 that results in a 2 bit error overflow, shown as yy 332. As depicted in 335, the intermediary value of N is shifted 16 bits to the left, referred to in FIG. 3B as $N_2$, and utilized in the next iteration. As shown in FIG. 3B, two more iterations are performed (340 and 345, respectively) to obtain 18 bits of the mantissa of Q3 (representing a concatenation of (1) a 2 bit error adjustment for the second 16 bits, and (2) the subsequent third 16 bits of the 64 bit quotient of N and D) and 18 bits of the mantissa of Q4 (representing a concatenation of (1) a 2 bit error adjustment for the third 16 bits, and (2) the subsequent fourth 16 bits of the 64 bit quotient of N and D). Similar to the previous iterations, subtraction step 437 of the last iteration 345 may result in a 2 bit error remainder, referred to as rr 350 in FIG. 3B, due to the loss of precision in generating Q4. The final 64 bit quotient is generated, as shown in 355, by concatenating Q1, Q2, Q3 and Q4 in an overlapping manner so as to enable the upper 2 bits of Q2, Q3 and Q4, which represent error adjustments, to be added to the bottom 2 bits of Q1, Q2 and Q3 respectively. Additionally, if the 2 bit error remainder rr 350 is greater than zero, 1 is added to the final quotient, as depicted in 360 to adjust for such error.

Figure 4:
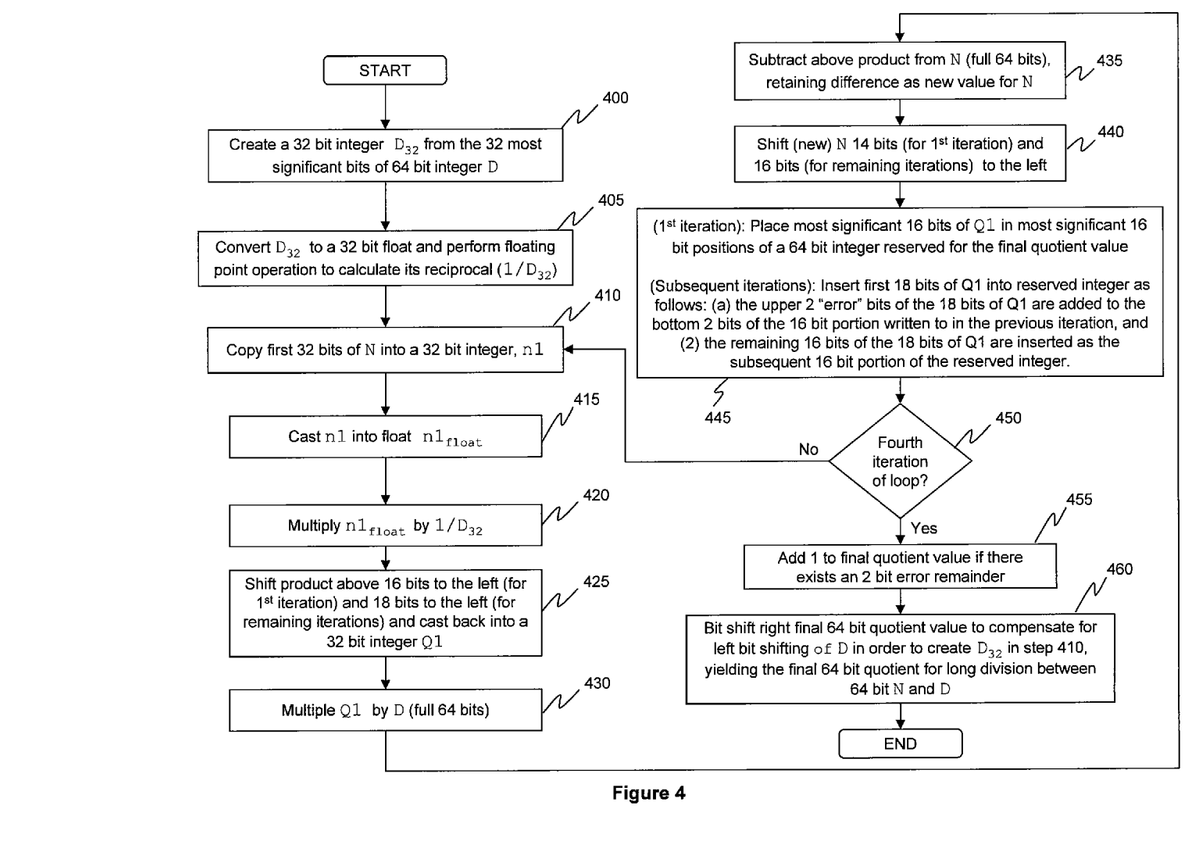
FIG. 4 is a flow diagram of method steps for performing integer division between two 64 bit integers, according to one embodiment of the invention.

FIG. 4 is a flow diagram of method steps for performing integer division between two 64 bit integers, according to one embodiment of the invention. Although the method steps are described in conjunction with FIG. 4, persons skilled in the art will understand that any system configured to perform the method steps, in any order, falls within the scope of the present invention Similar to FIGS. 3A-3B, as used in FIG. 4, the first 64 bit integer is N and represents the numerator and the second 64 bit integer is D and represents the denominator. The method begins at step 400, where a compiler 280 creates a 32 bit integer $D_{32}$ from the 32 most significant bits of 64 bit integer D (e.g., left bit shifting D until the most significant bit position contains the first 1 of the value of D). At step 405, compiler 280 converts $D_{32}$ to a 32 bit float and performs a floating point operation to calculate its reciprocal ($1/D_{32}$). At step 410, compiler 280 copies the first 32 bits of N into a 32 bit integer, n1. At step 415, compiler 280 casts n1 into a float, $n1_{float}$, and at step 420, compiler 280 multiplies $n1_{float}$ by $1/D_{32}$, yielding a float product, which compiler 280 then shifts 16 bits to the left (on a first iteration, and 18 bits on subsequent iterations) and casts back into a 32 bit integer Q1, at step 425. At step 430, compiler 280 multiplies Q1 by D (full 64 bits) and at step 435, compiler 280 subtracts the product from N (full 64 bits), the difference being retained as a new value for N. At step 440, compiler 280 shifts this new N 14 bits (on a first iteration, and 16 bits on subsequent iterations) to the left. At step 445, during a first iteration, compiler 280 places the first 16 bits of Q1 in the first most significant 16 bits of a 64 bit integer reserved for the final quotient value. In subsequent iterations of step 445, compiler 280 inserts the first 18 bits of Q1 into the 64 bit integer reserved for the final 64 bit quotient as follows: (1) the upper 2 bits of the 18 bits of Q1 are added to the bottom 2 bits of the 16 bit portion written to in the previous iteration, and (2) the remaining 16 bits of the 18 bits of Q1 are inserted as the subsequent upper 16 bit portion of the 64 bit integer. At step 450, if the iteration if less than 4, compiler 280 returns to step 410 to continue the process. If the fourth iteration has completed, then at step 455, compiler 280 adds 1 to the final 64 bit quotient if the fourth iteration resulted in a 2 bit error remainder (see, e.g., 2 bit error remainder rr 350 in FIG. 3B), and in step 460, compiler 280 bit shifts final 64 bit quotient value back right to compensate for the left bit shifting of D in order to create $D_{32}$ in step 410, yielding the final 64 bit quotient for long division between 64 bit N and D.

The following Example further includes a C-based code used by a compiler when it encounters 64 bit integer division between N and D. It should be recognized that this Example reflects an embodiment of the invention that executes within an NVDIA GPU, and therefore includes functions (e.g., fsetround( ), etc.) specifically relating floating point instructions available in such NVDIA GPU. It should be recognized that various bit shifting and other alternative general programming techniques used to manipulate bits between various types of variables may be used in embodiments and that the Example sets forth one potential code base:

EXAMPLE

```
static UInt64 divide (UInt32 n1, UInt32 n0, UInt32 d1, UInt32 d0)
{
   UInt32 order_d;
   UInt32 D;
   fesetround(FE_TOWARDZERO);
   /*
    * Step 0: Get the most significant bits of the 64 bit
    *         number (d1, d0) in a 32 bit integer. Also
    *         calculate the bit position of the most
    *         significant bit (the order of d1, d0)
    */
   UInt32 d;
   if (d1 != 0) {d = d1;}
      else {d = d0;}
   order_d = order(d);
   D = d << (31 – order_d);
   if (d1 != 0) {
      if (order_d != 31) {
         D += d0 >> (order_d + 1);
         order_d += 32;
      }
   }
   /*
    * Step 1: Calculate a single precision floating point
    *         value lower than 1/D, within relative
    *         precision of 2**-22
    */
   fsetround(FE_TONEAREST);
   Float fD         = D;
   Float f_D        = 1.0f/fD;
   Float f_Dlowered = Lower(f_D);
```

EXAMPLE-continued

```
   fsetround(FE_TOWARDZERO);
   /*
    * Step 2: Left shift d1, d0 to get its most significant
    *         bit a position 63
    */
   UInt32 l = 64 – order_d;
   if (l == 0) { /* nothing */ }
   else {
      if (l == 32) {
         d1 = d0;
         d0 = 0;
      } else {
         UInt32 r;
         if (l < 32) {
            r = 32 – l;
            d1 = (d1 << l) | (d0 >> r);
            d0 = (d0 << l);
         } else {
            l = l – 32;
            r = 32 – l;
            d1 = (d0 << l)'
            d0 = 0;
         }
      }
   /*
    * Get 3*24 bit representation of d, and forget all about d
    * afterwards to reduce register pressure.
    */
   UInt32 a2 = (d1 >> 8);
   UInt32 a1 = (d1 << 16) | (d0 >> 16);
   UInt32 a0 = (d0 << 8);
   UInt32 q1 = 0, q0 = 0;
   /*
    * Loop 4 times, deriving one 16 bit result digit per
    * iteration. The first iteration is handled a little bit
    * differently and can be peeled off in another
    * implementation.
    * The first iteration leaves a 2 bit overflow area in the
    * two highest bits of n. It can be shown that due to the
    * inexact 'Dlowered' a value of at most 2 is left, which
    * is rounded up in the next iteration by yielding 2 bits
    * of prevision in the estimation of Q (because we are
    * using only about 16 and have about 21, there is ample
    * precision slack for this.)
    * Also note that the last two iterations can be done in 32
    * bit precision, so peeling off the last two can save some
    * more cycles in this algorithm. In case we do this
    * peeling, then the first two iterations can ignore
    * updating q1, saving even more cycles, and also saving
    * more registers because an increased prevision in q is
    * used with a decreased precision in n.
    */
   for (UInt32 i = 0; i < 4; i++) {
      /*
       * Step 3.i: Using floating point calculations with
       *          rounding mode towards zero, calculate the
       *          the highest 21 bits of the quotient: Note
       *          that due to scaling of D and lowering of
       *          the reciprocal of this scaled value,
       *          f_Dlowered * n1 returns a value between
       *          zero (inclusive) and two (exclusive).
       *          So an 8 bit digit can be split off by
       *          multiplication with 128.
       */
      Float fErr1 = n1;
      Float fQ1;
      if (i == 0) {
         fQ1 = fErr1 * f_Dlowered * ((1 << 15));
      }else {
         fQ1 = fErr1 * f_Dlowered * ((1 << 15) * 4);
      }
      UInt32 Q1 = (UInt32)fQ1;
      /*
       * Step 4.i: n -= Q1 * D
       */
      UInt32 Q12 = 2 * Q1;
      UInt32 s3  = UMUL24HI(Q12, a2) >> 8;
      UInt32 s21 = UMUL24HI(Q12, a1) >> 8;
      UInt32 s11 = UMUL24HI(Q12, a0) >> 8;
```

EXAMPLE

```
        UInt32 s20 = UMUL24LO(Q12, a2) & 0x00ffffff;
        UInt32 s21 = UMUL24LO(Q12, a1) & 0x00ffffff;
        UInt32 s1 = s10 + s11;
        UInt32 s2 = s20 + s21;
        s2 += s1 >> 24; s1 &= 0x00ffffff;
        UInt32 c1, c0;
        if (i == 0) {
           // << 16
           c1 = (s3 << 16) + (s2 >> 8);
           c0 = (s2 << 24) + (s1);
        } else {
           // << 14
           c1 = (s3 << 14) + (s2 >> 10);
           c0 = (s2 << 22) + (s1 >> 2);
           n1 -= c1 + BORROW(n0, c0);
           n0 -= c0;
        /*
         * Step 5.i: Shift n and q, and shift Q1:
         */
        if (i == 0) {
           // << 14
           n1 = (n1 << 14) | (n0 >> 18);
           n0 = (n0 << 14);
        } else {
           // << 16
           n1 = (n1 << 16) | (n0 >> 16);
           n0 = (n0 << 16);
        }
           q1 = (q1 << 16) | (q0 >> 16);
           q0 = (q0 << 16);
           q1 += CARRY(q0, Q1);
           q0 += Q1;
        } // for loop
        /*
         * Step 6: Round up error <= 1 in q by reconstructing
         * a shifted value of d from a.
         */
        d1 = (a2 << 7) | (a1 >> 17);
        d0 = (a1 << 15) |(a0 >> 9);
        UInt32 error = n1 >= d1;
        q1 += CARRY(q0, error);
        q0 += error;
        /*
         * Step 7: Right shift q as compensation for Step 2
         */
        UInt32 r = order_d;
        if (r == 0) { /* nothing */ }
        else {
           if (r == 32) {
              q0 = q1;
              q1 = 0;
           } else {
              UInt32 l;
              if (r < 32) {
                 l = 32 - r;
                 q0 = (q0 >> r) | (q1 << l);
                 q1 = (q1 >> r);
              } else {
                 r = r - 32;
                 q0 = (q1 >> r);
                 q1 = 0;
              }
           }
        }
        return (((UInt64)q1) << 32) | q0;
}
/************* Supporting functions, structs, unions ************/
typedef struct {
   UInt32           mantissa : 23;
   UInt32           biased_exp : 9;    // includes sign bit (0)
} My_Float;
typedef union {
   float            fl;
   My_Float         mfl;
} Float_Conv;
static UInt32 order(UInt32 n)
{
   Float_Conv conv;
   conv.fl = n;
   return conv.mfl.biased_exp - 127;
}
static inline Float Lower(Float x)
{
   UInt32 *ip = (UInt32*)&x;
   *ip -= 3;
   return x;
}
static int CARRY(UInt32 a, UInt32 b)
{
   return (a*b) < a;
}
static int BORROW(UInt32 a, UInt32 b)
{
   return (a-b) > a;
}
static UInt32 UMUL24LO(UInt32 a, UInt32 b)
{
   return (a & 0x00ffffff) * (b & 0x00ffffff);
}
static UInt32 UMUL24HI(UInt32 a, UInt32 b)
{
   return ((UInt64) (a & 0x00ffffff) * ((UInt64) (b * 0x00ffffff)) >> 16;
}
```

While the foregoing is directed to embodiments of the present invention, other and further embodiments of the invention may be devised without departing from the basic scope thereof. For example, embodiments herein utilize a 2 bit error overflow under an assumption that underestimations are capped at 2. However, it should be recognized that bit error overflows in alternative embodiments may be more or less bits depending upon the cap of underestimations as a result of loss of precision. Similarly, embodiments herein have utilized a 32 bit floating point division operation as the low precision (e.g., 32 bit) operation that is available in hardware for use in higher precision (e.g., 64 bit) integer division. However, it should be recognized that, consistent with the teachings herein, any other available low precision operation available in hardware may be utilized, including, for example, a 32 bit integer division operation that is available in hardware. Similarly, the descriptions herein use 64 bit integers and 32 bit floating point variables in its embodiments, however, it should be recognized that the techniques disclosed herein may be used with any integer bit size that is greater than the bit size of the floating point variables used by the FPUs. Similarly, the descriptions herein depict the transformation of original code 270, written in the C language, into a sequence of instructions that are also expressed in the C language. However, it should be recognized that any level of code generated during the compilation process may be transformed using the techniques described herein, including any intermediary forms of code, assembly code and the like. It should further be recognized that any other computer programming language such as C++, Java, other object-oriented languages, other procedural language and any other languages may be utilized in alternative embodiments. While the foregoing description has described integer division transformations from a compiler's perspective, it should be recognized that the same transformations can be considered as being executed by a processor at run-time (in accordance with code transformations made by the compiler). Furthermore, it should be recognized that the techniques disclosed herein may also be utilized directly by application programmers rather than compilers.

In addition, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for performing integer division between a numerator and a denominator on a processing unit that supports operations using variables of a first bit size, wherein the numerator and the denominator are integers having a second bit size that is greater than the first bit size, the method comprising:
   subdividing the numerator into a plurality of equal sized partitions, wherein each partition has a third bit size;
   converting the denominator into a variable of the first bit size;
   dividing the numerator by the variable of the first bit size to obtain a current approximation of a current portion of a quotient, wherein the current approximation of the current portion of the quotient has the third bit size;
   subtracting a product of the current approximation of the current portion of the quotient and the denominator from the numerator to generate a subsequent numerator, wherein a fourth bit size of most significant bits associated with the subsequent numerator represents a bit overflow error value utilized to correct the first approximation of the first portion of the quotient; and
   storing the current approximation of the current portion of the quotient in a memory.

2. The method of claim 1, further comprising the steps of:
   dividing the subsequent numerator by the variable of the first bit size to obtain a subsequent approximation of a subsequent portion of the quotient that has a bit size equal to the third bit size plus the fourth bit size;
   adding a number of most significant bits equal to the fourth bit size associated with the subsequent approximation to a number of least significant bits equal to the fourth bit size associated with the current approximation to generate a corrected current approximation of the current portion of the quotient;
   multiplying the subsequent approximation of the subsequent portion of the quotient with the denominator to obtain a product; and
   subtracting the product from the subsequent numerator to generate a next numerator, wherein the fourth bit size of most significant bits associated with the next numerator represents a bit overflow error value utilized to correct the subsequent approximation of the subsequent portion of the quotient.

3. The method of claim 2, wherein the steps of dividing, adding, multiplying and subtracting in claim 2 are repeated, wherein, for each current iteration of the dividing, adding, multiplying and subtracting steps, the next numerator generated in the subtracting step of the immediately preceding iteration is used as the subsequent numerator in the dividing step of the current iteration, the subsequent approximation obtained in the dividing step of the current iteration is used as the subsequent approximation in the adding step of the current iteration, and the subsequent approximation obtained in the dividing step of the immediately preceding iteration is used as the current approximation of the adding step of the current iteration, until a total number of corrected approximations of portions of the quotient have been generated equal to the number of equal sized partitions included in the plurality of equal sized partitions.

4. The method of claim 3, further comprising adding one to a final quotient to compensate for a final bit overflow error value of a last iteration.

5. The method of claim 1, wherein the dividing step is performed by a floating point hardware unit and the supported variables of the first bit size are floating point variables that have mantissas of a fifth bit size.

6. The method of claim 5, wherein the third bit size is less than the fifth bit size.

7. The method of claim 6, wherein the first bit size is 32, the second bit size is 64, the third bit size is 16 and the fourth bit size is 2.

8. A non-transitory computer-readable medium including instructions that, when executed by a processing unit that supports operations using variables of a first bit size, causes the processing unit to perform integer division between a numerator and a denominator, wherein the numerator and the denominator are integers having a second bit size that is greater than the first bit size, by performing the steps of:
   subdividing the numerator into a plurality of equal sized partitions, wherein each partition has a third bit size;
   converting the denominator into a variable of the first bit size;
   dividing the numerator by the variable of the first bit size to obtain a current approximation of a current portion of a quotient, wherein the current approximation of the current portion of the quotient has the third bit size;
   subtracting a product of the current approximation of the current portion of the quotient and the denominator from the numerator to generate a subsequent numerator, wherein a fourth bit size of most significant bits associated with the subsequent numerator represents a bit overflow error value utilized to correct the first approximation of the first portion of the quotient; and
   storing the current approximation of the current portion of the quotient in a memory.

9. The non-transitory computer-readable medium of claim 8, wherein the processing unit further performs the steps:
   dividing the subsequent numerator by the variable of the first bit size to obtain a subsequent approximation of a subsequent portion of the quotient that has a bit size equal to the third bit size plus the fourth bit size;
   adding a number of most significant bits equal to the fourth bit size associated with the subsequent approximation to a number of least significant bits equal to the fourth bit size associated with the current approximation to generate a corrected current approximation of the current portion of the quotient;
   multiplying the subsequent approximation of the subsequent portion of the quotient with the denominator to obtain a product; and
   subtracting the product from the subsequent numerator to generate a next numerator, wherein the fourth bit size of most significant bits associated with the next numerator represents a bit overflow error value utilized to correct the subsequent approximation of the subsequent portion of the quotient.

10. The non-transitory computer-readable medium of claim 9, wherein the steps of dividing, adding, multiplying and subtracting in claim 9 are repeated, wherein, for each current iteration of the dividing, adding, multiplying and subtracting steps, the next numerator generated in the subtracting step of the immediately preceding iteration is used as the subsequent numerator in the dividing step of the current iteration, the subsequent approximation obtained in the dividing step of the current iteration is used as the subsequent approximation in the adding step of the current iteration, and the subsequent approximation obtained in the dividing step of the immediately preceding iteration is used as the current approximation of the adding step of the current iteration, until a total number of corrected approximations of portions of the quotient have been generated equal to the number of equal sized partitions included in the plurality of equal sized partitions.

11. The non-transitory computer-readable medium of claim 10, wherein the processing unit further performs the step of adding one to a final quotient to compensate for a final bit overflow error value of a last iteration.

12. The non-transitory computer-readable medium of claim 11, wherein the third bit size is less than the fifth bit size.

13. The computer-readable medium of claim 8, wherein the dividing step is performed by a floating point hardware unit and the supported variables of the first bit size are floating point variables that have mantissas of a fifth bit size.

14. The non-transitory computer-readable medium of claim 13, wherein the first bit size is 32, the second bit size is 64, the third bit size is 16 and the fourth bit size is 2.

15. A computing system configured to perform integer division between a numerator and a denominator on a processing unit that supports operation using variables of a first bit size, wherein the numerator and the denominator are integers having a second bit size that is greater than the first bit size, the computer system comprising:
 a system memory configured to store a code segment containing the integer division and a compiler; and
 a processor coupled to the system memory, wherein the processor is configured to execute the compiler to perform the steps of: subdividing the numerator into a plurality of equal sized partitions, wherein each partition has a third bit size, converting the denominator into a variable of the first bit size, dividing the numerator by the variable of the first bit size to obtain a current approximation of a current portion of a quotient, wherein the current approximation of the current portion of the quotient has the third bit size, subtracting a product of the current approximation of the current portion of the quotient and the denominator from the numerator to generate a subsequent numerator, wherein a fourth bit size of most significant bits associated with the subsequent numerator represents a bit overflow error value utilized to correct the first approximation of the first portion of the quotient, and storing the current approximation of the current portion of the quotient in a memory.

16. The computing system of claim 15, wherein the processor further performs the steps:
 dividing the subsequent numerator by the variable of the first bit size to obtain a subsequent approximation of a subsequent portion of the quotient that has a bit size equal to the third bit size plus the fourth bit size;
 adding a number of most significant bits equal to the fourth bit size associated with the subsequent approximation to a number of least significant bits equal to the fourth bit size associated with the current approximation to generate a corrected current approximation of the current portion of the quotient;
 multiplying the subsequent approximation of the subsequent portion of the quotient with the denominator to obtain a product; and
 subtracting the product from the subsequent numerator to generate a next numerator, wherein the fourth bit size of most significant bits associated with the next numerator represents a bit overflow error value utilized to correct the subsequent approximation of the subsequent portion of the quotient.

17. The computing system of claim 16, wherein the steps of dividing, adding, multiplying and subtracting in claim 16 are repeated, wherein, for each current iteration of the dividing, adding, multiplying and subtracting steps, the next numerator generated in the subtracting step of the immediately preceding iteration is used as the subsequent numerator in the dividing step of the current iteration, the subsequent approximation obtained in the dividing step of the current iteration is used as the subsequent approximation in the adding step of the current iteration, and the subsequent approximation obtained in the dividing step of the immediately preceding iteration is used as the current approximation of the adding step of the current iteration, until a total number of corrected approximations of portions of the quotient have been generated equal to the number of equal sized partitions included in the plurality of equal sized partitions.

18. The computing system of claim 15, wherein the processor further performs the step of adding one to a final quotient to compensate for a final bit overflow error value of a last iteration.

19. The computing system of claim 15, wherein the dividing step is performed by a floating point hardware unit and the supported variables of the first bit size are floating point variables that have mantissas of a fifth bit size.

20. The computing system of claim 15, wherein the third bit size is less than the fifth bit size.

* * * * *